(12) United States Patent
Taylor, Jr.

(10) Patent No.: US 6,349,976 B1
(45) Date of Patent: Feb. 26, 2002

(54) PIPE IN PIPE ASSEMBLY

(75) Inventor: Leland Harris Taylor, Jr., Houston, TX (US)

(73) Assignee: Mentor Subsea Technology Services, Inc., Houston, TX (US)

( * ) Notice: Subject to any disclaimer, the term of this patent is extended or adjusted under 35 U.S.C. 154(b) by 0 days.

(21) Appl. No.: 09/514,115

(22) Filed: Feb. 28, 2000

(51) Int. Cl.[7] .............................................. F16L 17/00
(52) U.S. Cl. ........................ 285/123.1; 285/47; 285/48
(58) Field of Search ................................ 138/112, 113; 285/47, 123.1, 123.15, 48, 288.1, FOR 120

(56) References Cited

U.S. PATENT DOCUMENTS

| | | | | |
|---|---|---|---|---|
| 4,163,042 A | * | 7/1979 | Lynch ........................ 138/112 |
| 4,163,474 A | * | 8/1979 | MacDonald et al. ........ 138/112 |
| 4,865,359 A | | 9/1989 | Roberts | |
| 5,996,643 A | * | 12/1999 | Stonitsch .................... 138/113 |
| 6,032,699 A | * | 3/2000 | Cochran et al. ............. 138/112 |
| 6,116,290 A | * | 9/2000 | Ohrn et al. .................. 138/113 |
| 6,234,163 B1 | * | 5/2001 | Garrod ........................ 138/113 |

FOREIGN PATENT DOCUMENTS

| | | | | |
|---|---|---|---|---|
| DD | 000230915 | * | 12/1985 | |
| EP | 0334010 | * | 9/1989 | .................. 285/47 |

* cited by examiner

Primary Examiner—Lynne H. Browne
Assistant Examiner—Aaron Dunwoody
(74) Attorney, Agent, or Firm—D. Neil LaHaye; Rob Baraona; Eric Marich

(57) ABSTRACT

A pipe in pipe assembly. A coupling is used to join the ends of the inner pipe. The inner pipe is centralized within the inner pipe to provide axial resistance but minimum restraint transverse to the axis of the assembly. This provides sufficient flexibility of the inner pipe to accommodate the necessary tolerances to permit the use of the coupling. The inner pipe may be centralized within the outer pipe by the use of foam injected between the inner and outer pipe and a corrugated web sleeve around the ends of the inner pipe. The inner pipe may also be centralized within the outer pipe by the use of a corrugated web bulkhead that fits around the inner pipe and within the outer pipe.

7 Claims, 5 Drawing Sheets

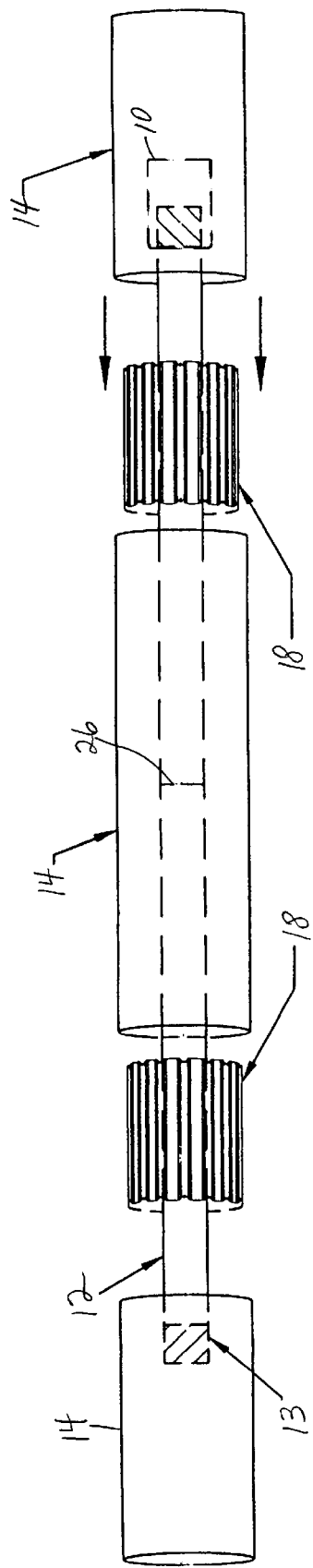
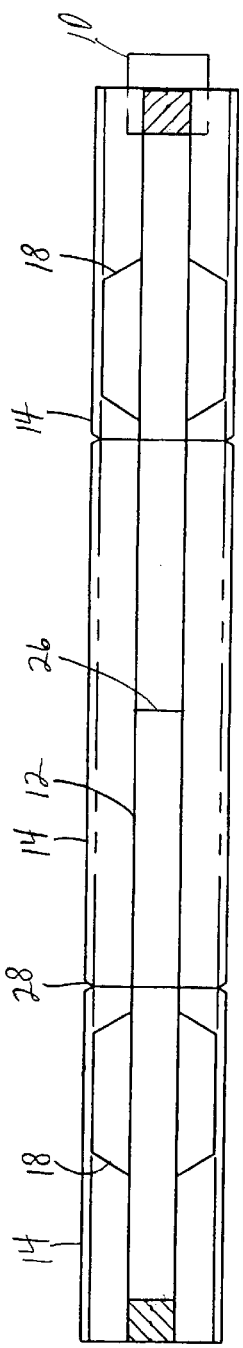
FIG. 8
FIG. 9

PIPE IN PIPE ASSEMBLY

BACKGROUND OF THE INVENTION

1. Field of the Invention

The invention is generally related to the use of pipe to transport hydrocarbons and more particularly to the pipe in pipe configurations used in the offshore environment.

2. General Background

The development and production of hydrocarbon reserves offshore may require certain levels of temperature to be maintained within the associated submarine pipeline and riser network to assure flowing of the transported fluids in the required state and operating pressure. To provide high levels of thermal insulation in submarine pipelines, typically at greater depths, a dual steel wall "pipe-in-pipe" construction is used. The annular space between the outer pipe and inner pipe can be filled with an insulating layer of either a vacuum or a material of suitable insulating nature such as low-density polyurethane foam. In some designs bulkheads are installed at prescribed distances along the pipeline to compartmentalize flooding that may result due to a leak in the outer pipe. These bulkheads are typically made from a machined steel forging or plate ring weldment. The bulkheads may also be used to connect the inner pipe axially to the outer pipe for the purposes of transmitting axial loads between the inner and outer pipes associated with thermal expansion or other loading mechanisms.

Other means of insulating pipelines include the use of polymeric coatings to provide insulation. The insulating effectiveness of these materials is less than pipe in pipe. At greater depth, especially where high levels of insulation are required, the coatings are costly, if not impractical to install.

To date, the installation of pipe in pipe offshore entails the field jointing of sections of pre-fabricated pipe in pipe joints by welding. A pipe in pipe joint is fabricated from random length pipe of the required diameters and wall thickness issued from the mill. Multiple joint lengths of pipe may be assembled to create a longer pipe in pipe joint to minimize the number of pipe in pipe field joints needed to be field welded.

In all cases to date, the inner pipe is field jointed by butt-welding. The outer pipes are joined by one of two methods: the use of a sliding outer pipe or the use of sleeves/half-shells. A sliding outer pipe allows it to slip along the axis of the inner pipe after the inner pipe butt weld has been completed to permit the outer pipes to be aligned and welded as a butt weld. Where the slipping of the outer pipe is not possible due to bulkheads connecting the inner and outer pipe, the adjacent outer pipe joints are joined by using welded sleeves or half-shells to bridge the gap between the adjacent outer pipes that provide the required access to weld in the inner pipe.

For J-lay installation, the sliding outer pipe has evolved as the most cost-effective means of completing a pipe in pipe joint. Alternatives to the sliding outer pipe or sleeves are proprietary couplings (such as those by Snamprogetti) that merge the inner and outer pipe ends at both ends of a pipe in pipe joint into a single, thicker wall. This allows the joint between pipe in pipe joints to be only a single butt weld. The merged wall couplings must accommodate the stress changes that can occur in the pipeline as a result of the dramatic change in section properties that occur at the coupling. Use of the coupling also impacts the uniformity of insulating properties.

Jointing of single wall land and submarine pipelines using methods other than welding have been developed. These alternative methods include: threaded connections, cold forged joining and interference fit connections (such as the Jetair International Positive Seal Coupling System) that use a polymer to provide bonding and sealing properties for the coupling. Critical to the physical performance of this coupling is the dimensional tolerances and alignment of the pipes to permit the interference fit of the coupling.

In the case of submarine pipelines, their installation using either S-lay or J-lay installation techniques involves using spreads of specialist marine equipment and personnel. The high cost of operating these spreads requires the design of field joints of submarine pipelines to be practically completed in as little time as possible without compromising the integrity of the pipeline joint design. The current technology used to field joint pipe in pipe joints, while technically sound, is timely and costly.

The existing designs for field jointing of pipe in pipe pipelines result in the installed cost of submarine pipe in pipe pipelines to greatly exceed single wall pipelines. In the case of double walled field joints, significant cost arises during installation due to the need to complete two or more welds, including the required non-destructive testing and corrosion coating. In the case of merged wall couplings, higher cost results from the manufacturing and assembly of the coupling to the pipe in pipe joints and the greater wall thickness typically required to manage the stress levels in the coupling.

It is seen from the above that the current state of the art leaves a need for improvement in the design of pipe in pipe construction and the field jointing of pipe in pipe pipelines in order to provide certain technical and economic benefits.

SUMMARY OF THE INVENTION

The invention addresses the above need. What is provided is a pipe in pipe assembly where a coupling is used to join the ends of the inner pipe. The inner pipe is substantially centralized within the inner pipe in a manner that provides axial resistance but minimum restraint transverse to the axis of the assembly. This provides sufficient flexibility of the inner pipe to accommodate the necessary tolerances to permit the use of the coupling. The inner pipe may be centralized within the outer pipe by the use of foam injected between the inner and outer pipe and a corrugated web sleeve around the ends of the inner pipe. The inner pipe may also be centralized within the outer pipe by a corrugated web bulkhead that fits around the inner pipe and within the outer pipe.

BRIEF DESCRIPTION OF THE DRAWINGS

For a further understanding of the nature and objects of the present invention reference should be made to the following description, taken in conjunction with the accompanying drawings in which like parts are given like reference numerals, and wherein:

FIG. 8 illustrates a pipe in pipe assembly with the coupling and corrugated web bulkhead being used together.

FIG. 9 illustrates the assembly of FIG. 8 where the separate sections of outer pipe are welded together.

DETAILED DESCRIPTION OF THE PREFERRED EMBODIMENT

Figure 1:
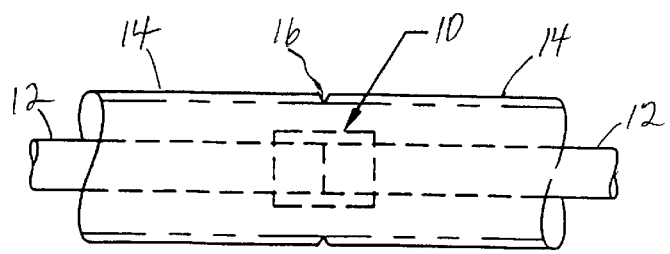
FIG. 1 illustrates two ends of separate inner pipe joints, within an outer pipe, connected together by a coupling.

FIG. 1 illustrates the use of a coupling 10 to connect the ends of two separate joints of inner pipe 12. Any type of coupling that provides a fluid tight seal and the necessary strength should be suitable. A coupling that uses an interference fit and polymer to provide bonding and sealing of the joint is preferred. The two joints of outer pipe 14 will be welded together at their ends as indicated by numeral 16.

Means for substantially centralizing the inner pipe 12 within the outer pipe 14 in a manner that provides axial resistance but minimum restraint transverse to the axis of the assembly is required. This is necessary to provide sufficient flexibility of the inner pipe to accommodate the necessary tolerances to permit the use of the coupling 10.

Figure 2:
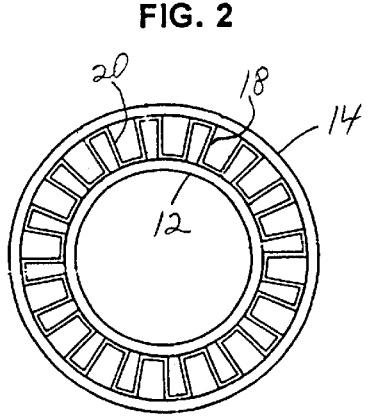
FIG. 2 is a cross sectional view that illustrates one means of centralizing the inner pipe within the outer pipe.
Figure 3:
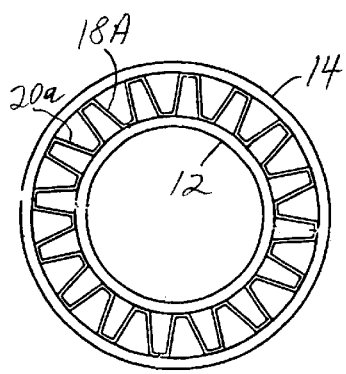
FIG. 3 illustrates an alternate embodiment of the centralizing means of FIG. 2.
Figure 4:
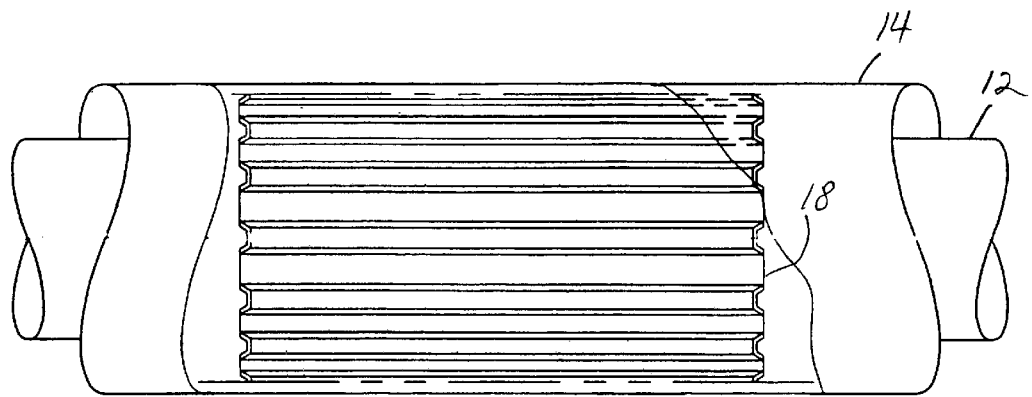
FIG. 4 is a longitudinal partial cutaway view of the centralizing means of FIG. 2 or 3.

FIG. 2 illustrates such a centralizing means in the form of a corrugated web bulkhead 18 that is received between the inner pipe 12 and the outer pipe 14. The bulkhead 18 contacts the outer diameter of the inner pipe 12 and the inner diameter of the outer pipe 14. The corrugations in the bulkhead 18 are designed to provide flexibility in the bulkhead so as to allow movement of the inner pipe 12 radially within the outer pipe 14 when the ends of two inner pipes 12 are connected together by a coupling 10. The bulkhead 18 may be made of any suitable high strength material such as metal. The thickness of the walls and spacing of the web for the web bulkhead are selected based on the strength of the bulkhead material used, the strength of the material used to bond the bulkhead to the inner and outer pipe and the load to be carried by the bulkhead. The corrugation height is based on the annulus fixed between the inner and outer pipes. The length that the bulkhead extends along the inner and outer pipes, as seen in FIG. 4, is determined by the bonding strength of the polymer used and the shear load capacity of the web thickness. It is preferable that the bonding polymer used to bond the bulkhead to the inner and outer pipes have a lap shear strength on the order of three thousand pounds per square inch and a tensile strength of three thousand pounds per square inch. In FIG. 2, the walls 20 of the bulkhead 18 that extend between the inner and outer pipes are radial in relation to the common center of the inner and outer pipes. In the alternate embodiment of FIG. 3, the walls 20*a* of the bulkhead are not radial to the common center of the inner and outer pipes.

Figure 5:
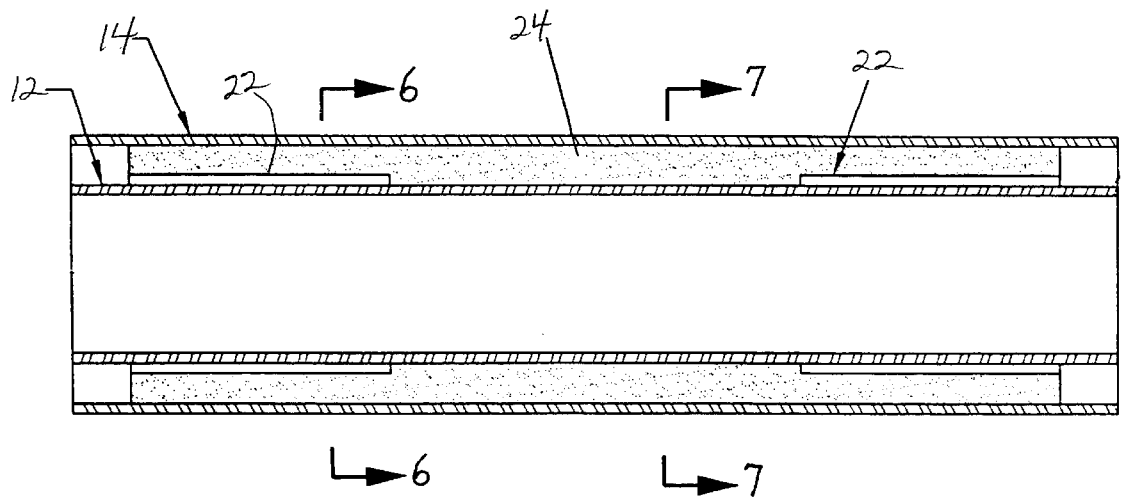
FIG. 5 is a longitudinal sectional view of an alternate embodiment of a means for centralizing the inner pipe within the outer pipe.
Figure 6:
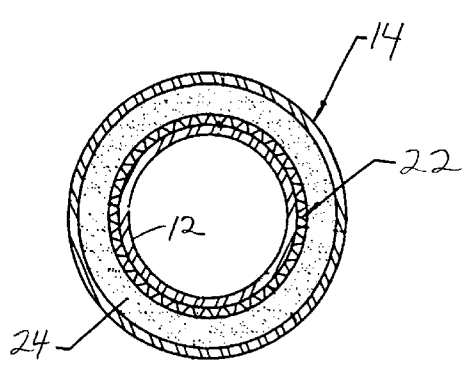
FIG. 6 is a view taken along lines 6—6 in FIG. 5.
Figure 7:
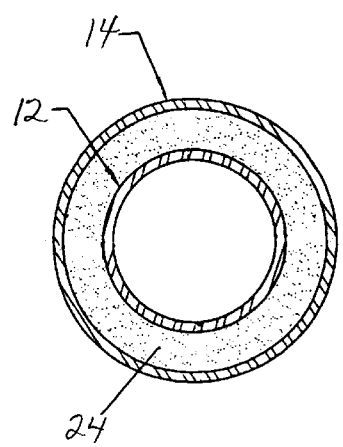
FIG. 7 is a view taken along lines 7—7 in FIG. 5.

FIG. 5–7 illustrate an alternate embodiment of a centralizing means as referred to above. A plastic corrugated web sleeve 22 is received around each end of the inner pipe 12 but does not extend into contact with the outer pipe 14. The web sleeve 22 is corrugated to provide flexibility, as described above relative to the bulkhead 18, to allow for connection of separate inner pipes 12 by a coupling 10. A foam material 24 is injected into the annulus defined between the inner and outer pipes around and between the corrugated web sleeves 22 while the inner and outer pipes are held in a jig (not shown) such that the inner pipe 12 is held substantially concentric with the outer pipe 14. The assembly of the inner and outer pipes is removed from the jig after the foam cures and provides the necessary support to maintain the inner pipe in its concentric position relative to the outer pipe.

Figure 10:
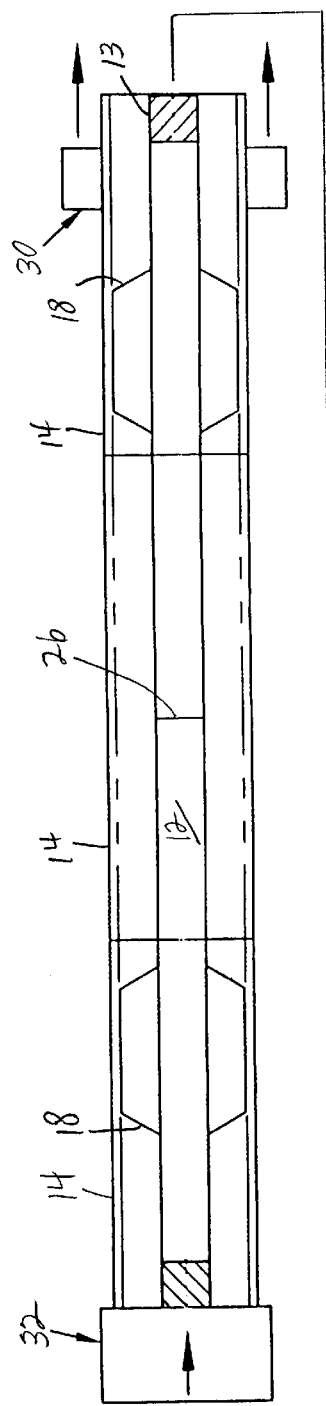
FIG. 10 illustrates the pipe in pipe assemblies moved together to connect the inner pipe ends together with the coupling.
Figure 10:
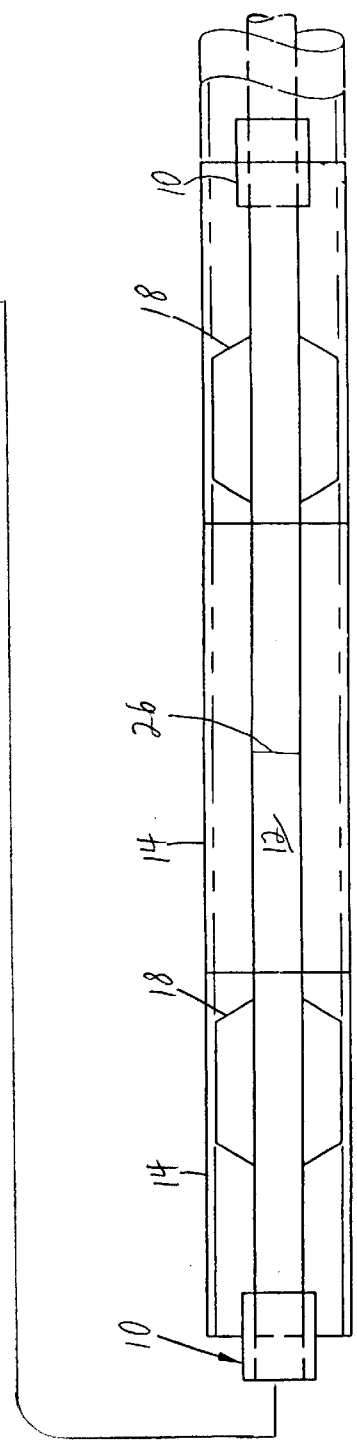

FIG. 8 illustrates a pipe in pipe assembly with the coupling 10 and corrugated web bulkhead 18 being used together to form the assembly. As indicated at numeral 13, the ends of the inner pipe 12 that are to be received in a coupling 10 are prepared. A selected number of sections of inner pipe 12 are welded together end-to-end as indicated at numeral 26. The necessary length of outer pipe 14 is slipped over the inner pipe 12. One or more corrugated web bulkheads 18 are slipped onto the inner pipe 12 at the appropriate positions and bonded into place. Additional sections of outer pipe 14 are then slipped over the inner pipe and bonded to the corrugated web bulkhead 18. FIG. 9 illustrates the assembly of FIG. 8 where the separate sections of outer pipe 14 are welded together as indicated at numeral 28. This forms a section that is easily added to other like sections offshore. This is accomplished by placing the complementary end of another assembly next to the first assembly. The assemblies are moved together as illustrated in FIG. 10 to connect the inner pipe ends together with the coupling 10. The ends of the outer pipes 14 are then welded together. Gripping jacks 30 may be used to force the assemblies together where a bulkhead is provided. An end jack 32 may be used at the end of the assembly where there are no bulkheads 18 in the joint.

Figure 11:
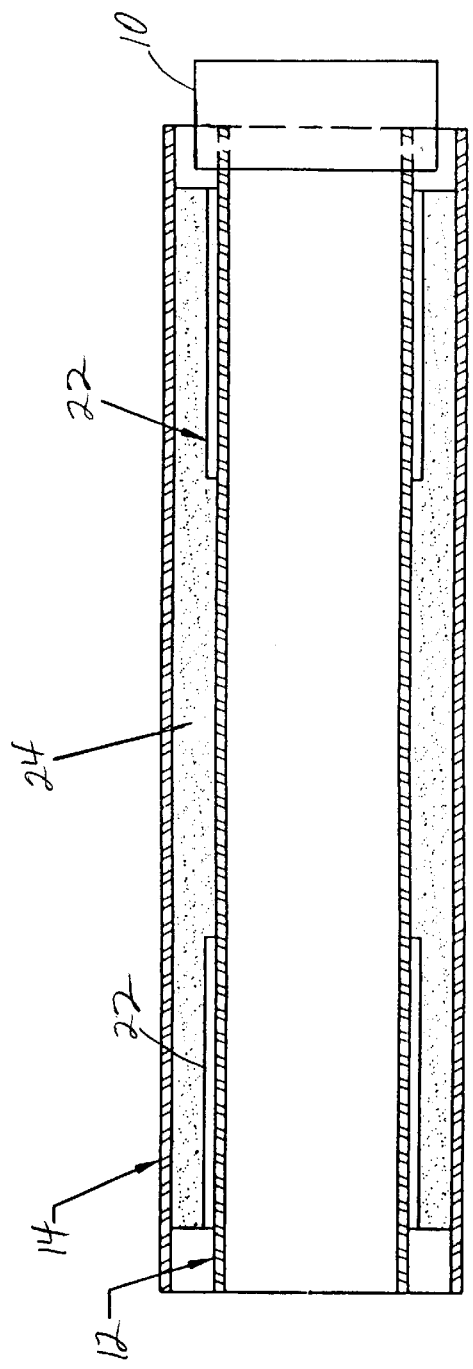
FIG. 11 illustrates a pipe in pipe assembly with the coupling and corrugated web material being used together to form the assembly.

FIG. 11 illustrates a pipe in pipe assembly with the coupling 10 and corrugated web sleeve 22 being used together to form the assembly.

Figure 12:
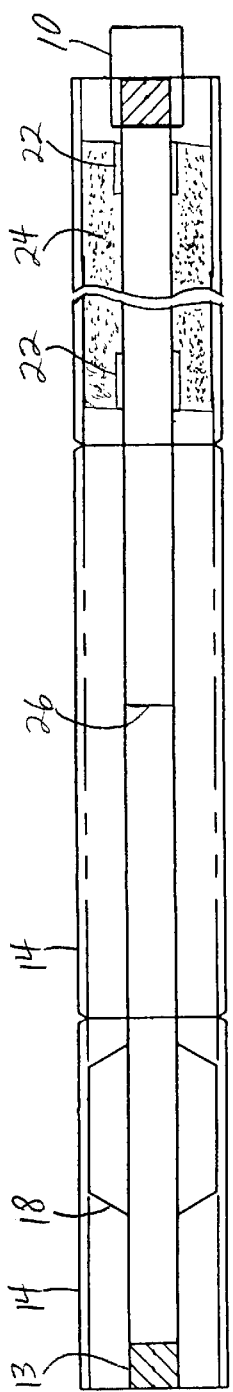
FIG. 12 illustrates a pipe in pipe assembly that uses a combination of both the corrugated web bulkhead and the corrugated web sleeve and foam with the coupling.

FIG. 12 illustrates a pipe in pipe assembly that uses a combination of both the corrugated web bulkhead 18 and the corrugated web sleeve 22 and foam 24 with the coupling 10.

The invention provides several advantages. The cost of installing pipe in pipe pipelines is reduced. Time motion analysis comparisons of the invention and that of butt welding the inner pipe and using a sliding outer pipe to permit a butt welding of the outer pipe joint indicates a cycle time savings on the order of forty percent for J-lay pipe lay operations. In addition to the improved cycle time, the invention eliminates the need to maintain a sliding outer pipe that reduces the fabrication cost of the pipe in pipe joint.

The use of the bonded, corrugated bulkhead design eliminates the need to use metal bulkheads that are materially costly and complex to assemble and can lead to stress concentrations due to the abrupt and rigid radial connection between the inner and outer pipe cross sections.

The corrugated metallic bulkhead of the invention will provide a rigid axial connection while providing a less rigid transverse support due to the diaphragm behavior of the axially radiating web of the corrugation.

The corrugated metallic bulkhead of the invention will provide a rigid axial connection while providing a maximum flow path and access through the annulus of the pipe in pipe assembly that allows the temperature of the inner pipe to be controlled through active means.

The use of a fixed outer pipe permitted by the use of the invention eliminates the need to field install bulkhead mechanisms that may be necessary in certain installations of pipe in pipe using the sliding outer sleeve design.

The use of non welded coupling within the welded outer pipe provides secondary containment in the event of leakage from the coupling where the design of the outer pipe is suitable to contain the operating pressure of the inner pipe.

Where corrosive conditions require the use of corrosion resistant metal in the inner pipe, the means of joining the inner pipe in the invention will eliminate the complexity and cost of welding exotic materials without increasing the complexity or time required to complete the pipe in pipe field joint.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A pipe in pipe assembly, comprising:
   a. an outer pipe;
   b. an inner pipe received in said outer pipe and defining an annulus between said inner and outer pipes;
   c. a corrugated web bulkhead received around said inner pipe and extending in the annulus defined between said pipes in contact with said outer pipe so as to position said inner pipe substantially concentric with said outer pipe; and
   d. a coupling received on the end of said inner pipe and designed to receive the end of a second inner pipe for connecting said inner pipes together.

2. The assembly of claim 1, wherein said corrugated web bulkhead is formed from metal or other suitable high strength material.

3. A pipe in pipe assembly, comprising;
   a. an outer pipe;
   b. an inner pipe received within said outer pipe so as to be substantially concentric therewith and defining an annulus between said inner and outer pipes;
   c. a corrugated web sleeve received around each end of said inner pipe and extending partially into the annulus between said inner and outer pipes;
   d. a foam material received in the annulus between said inner and outer pipes around and between said corrugated web sleeves, said foam material retaining said inner pipe in substantially concentric relationship with said outer pipe; and
   e. a coupling received on the end of said inner pipe and designed to receive the end of a second inner pipe for connecting said inner pipes together.

4. The assembly of claim 3, wherein said corrugated web sleeve is formed from plastic.

5. A pipe in pipe assembly, comprising:
   a. an outer pipe;
   b. an inner pipe received in said outer pipe and defining an annulus between said inner and outer pipes;
   c. a corrugated web bulkhead received around a first section of each end of said inner pipe and extending in the annulus defined between said pipes in contact with said outer pipe so as to position said inner pipe substantially concentric with said outer pipe;
   d. a corrugated web sleeve received around each end of a second section of said inner pipe and extending partially into the annulus between said inner and outer pipes;
   e. a foam material received in the annulus between said inner and outer pipes around and between said corrugated web sleeves, said foam material retaining said inner pipe in substantially concentric relationship with said outer pipe; and
   f. a coupling received on the end of said inner pipe and designed to receive the end of a second inner pipe for connecting said inner pipes together.

6. The assembly of claim 5, wherein said corrugated web bulkhead is formed from metal or other suitable high strength material.

7. The assembly of claim 5, wherein said corrugated web sleeve is formed from plastic.

* * * * *

UNITED STATES PATENT AND TRADEMARK OFFICE
CERTIFICATE OF CORRECTION

PATENT NO.     : 6,349,976 B1
DATED          : February 26, 2002
INVENTOR(S)    : Leland H. Taylor, Jr.

It is certified that error appears in the above-identified patent and that said Letters Patent is hereby corrected as shown below:

Column 3,
Line 61, after "bulkhead" insert -- 18a --.

Column 5,
Line 33, after "pipes" insert -- together, said coupling causing the ends of adjacent outer pipes to contact one another for connecting said outer pipes --.

Column 6,
Lines 11 and 35, after "pipes" insert -- together, said coupling causing the ends of adjacent outer pipes to contact one another for connecting said outer pipes --.

Signed and Sealed this

Twenty-sixth Day of November, 2002

Attest:

JAMES E. ROGAN
*Attesting Officer*   *Director of the United States Patent and Trademark Office*